Nov. 2, 1926.
J. M. COOK
1,605,097
DUMPING SCRAPER
Filed July 21, 1921
2 Sheets-Sheet 2
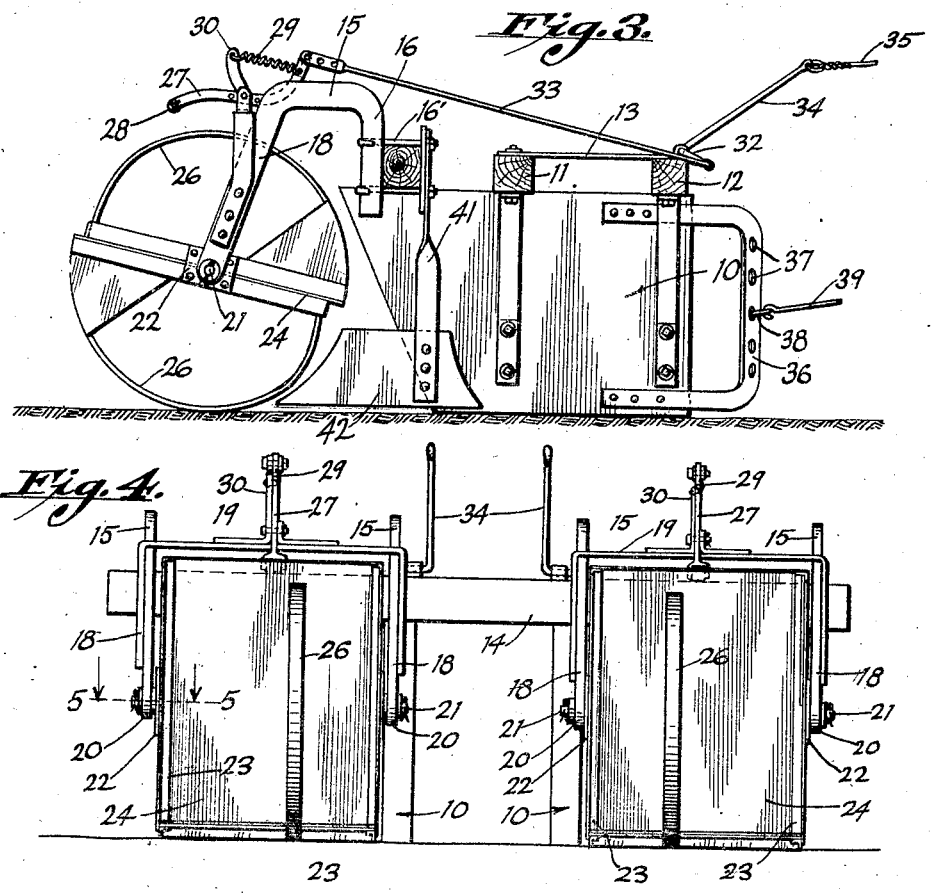
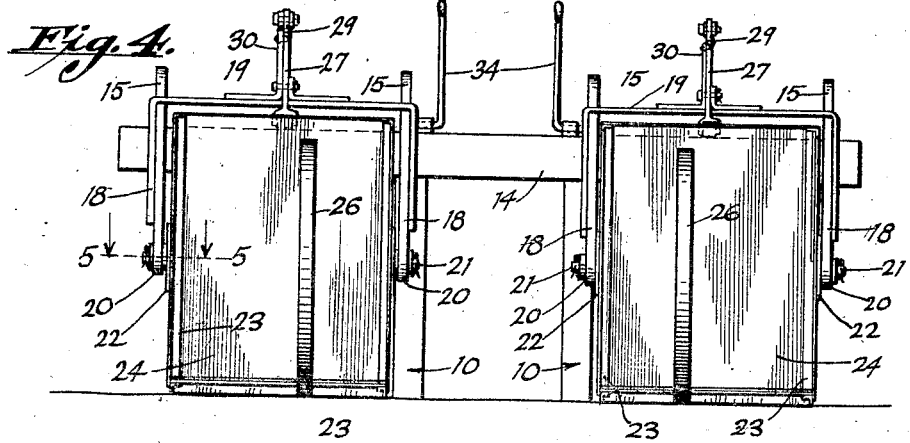
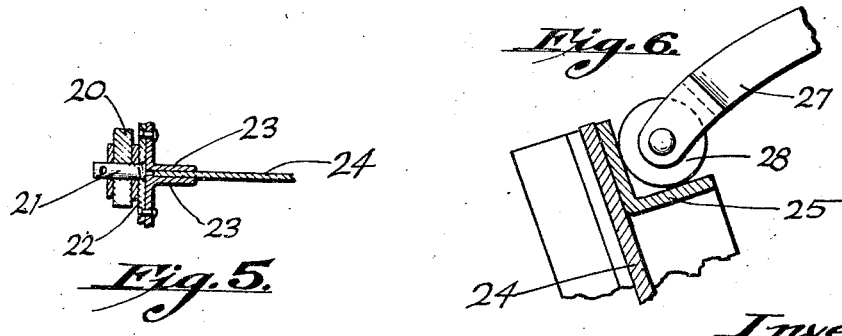
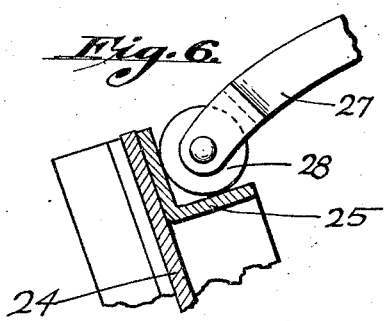
Inventor:
James M. Cook
By Hazard & Miller
Attorneys.

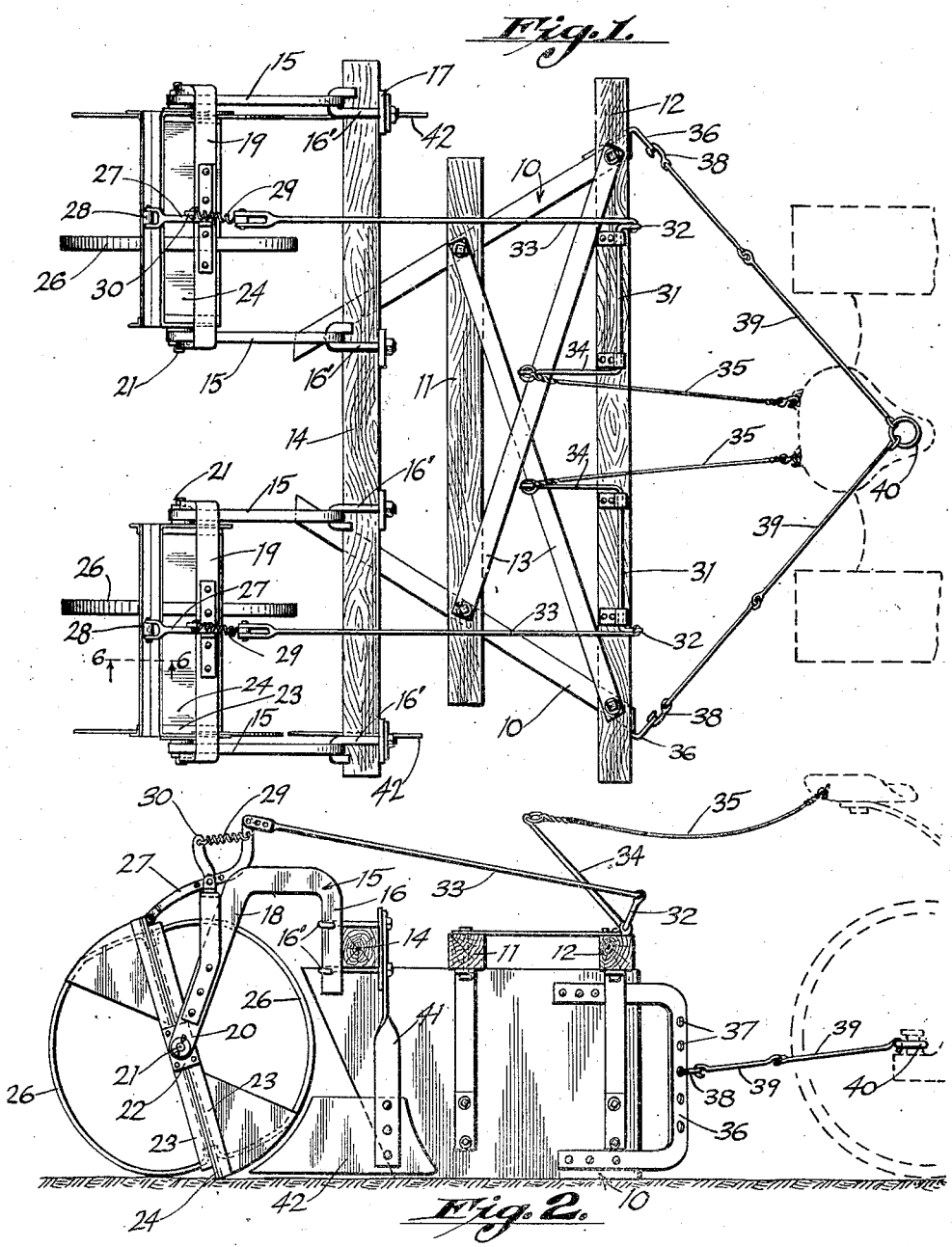

Patented Nov. 2, 1926.

1,605,097

UNITED STATES PATENT OFFICE.

JAMES M. COOK, OF ANAHEIM, CALIFORNIA.

DUMPING SCRAPER.

Application filed July 21, 1921. Serial No. 486,382.

My invention relates to a dumping scraper and ridger of the general type disclosed in my Patents No. 1,270,597, dated June 25, 1918, and No. 1,279,273, dated September 17, 1918; the principal objects of my invention being to generally improve upon and simplify the construction of the dumping scrapers and ridgers disclosed in the patents aforesaid, as well as other similar types of soil handling devices; to provide a combined dumping scraper and ridger that is adapted to be drawn over the ground in operation by a tractor or the like; to provide relatively simple and efficient means for retaining the scraping members in their active or ground scraping positions; and further to provide simple and easily operated means for effecting the release of said scraper retaining means, and which releasing means is operable from the tractor driver's seat.

With the foregoing and other objects in view, my invention consists in certain novel features of construction and arrangement of parts that will be hereinafter more fully described and claimed and which are illustrated in the accompanying drawings, in which:

Figure 1 is a top plan view of a combined dumping scraper and ridger of my improved construction.

Fig. 2 is a side elevational view of the combined dumping scraper and ridger.

Fig. 3 is an elevational view of the combined dumping scraper and ridger and showing the scraper blade engaging and holding means in released position so as to permit the scraper to rotate during the forward movement of the apparatus.

Fig. 4 is a rear elevational view of my improved dumping scraper and ridger.

Fig. 5 is an enlarged cross section taken approximately on the line 5—5 of Fig. 4.

Fig. 6 is an enlarged detail section taken approximately on the line 6—6 of Fig. 1.

Referring by numerals to the accompanying drawings which illustrate a practical embodiment of my invention, 10—10 designate vertically disposed inclined ridge forming scrapers, the upper portions of which are connected by transversely disposed beams 11 and 12. The structure formed by the scraper and beams is braced and reinforced by suitable cross braces 13. Mounted on the rear or inner end portions of the ridge forming scrapers 10 is a transversly disposed beam 14 that serves as a support or carrier for the frames of the rotary dumping scrapers.

Each of the rotary dumping scraper frames comprises a pair of inverted U-shaped members 15, the inner legs 16 of which are secured directly to beam 14. In the particular machine illustrated in the drawings the legs 16 are secured to the rear side of the beam 14 by means of hooks 16' positioned above and below the beam 14 and arranged in connection with plates 17 at the front side of the beam.

The rear legs 18 of the inverted U-shaped members 15 are substantially longer than the inner legs 16, and the upper portions of the legs 18 of each pair of members 15 are connected by a transverse bar 19. The lower ends of the longer legs 18 of the frame members 15 are provided with bearings 20 for trunnions 21, which project outwardly from plates 22. The plates 22 are attached to the outer faces of angle irons 23 mounted on either side of the end edges of the dumping scraper blades 24. Each scraper blade 24 is preferably a flat sheet metal member proportioned substantially as I have illustrated in the drawings. At the outer edges of each scraper blade 24 there is an outwardly facing angle iron 25. The two angle irons 25 in connection with each blade are arranged at opposite sides of the blade and so that one is at the front side of the blade at the upper edge of the blade and at the rear side of the blade at the lower edge of the blade. Each dumping scraper is provided with a pair of semicircular bands 26 which are arranged at opposite sides of the blade 24 and which, together, form a wheel-like structure which will carry the scraper around when it is released. The supporting bands 26 are connected to the cross angle irons 25 at points intermediate their ends. It will be obvious how the bands 26 will bear upon the ground as the scraper blade is reversing its position, or while it is rotating as the entire apparatus is being drawn forwardly over the ground. There are two wings at the outer end of each dumping scraper. The wings extend from opposite sides of the blade so that they extend forward when at the lower side of the scraper.

Fulcrumed on the intermediate portion of each cross bar 19 is an arm 27, the lower rear end of which is bifurcated to receive a rotatably mounted roller 28. Connected to the upper end of the arm 27 is one end of a retractile spring 29, the opposite end of which is connected to a bracket 30 that is fixed to and projects upwardly from the cross bar 19.

Journaled in suitable bearings on cross beam 12 are two rock shafts 31 one for each dumping scraper. At the outer end of each shaft is provided a short crank arm 32, and pivotally connected to the arm 32 is the forward end of a rod 33, the rear end of which is adjustably connected to the upper end of arm 27. The inner end of rock shaft 31 is provided with a relatively long crank arm 34 that is disposed at an angle of approximately 60 degrees to the rear relative to the short crank arm 32. Secured to the upper end of the longer crank arm 34 is a flexible member, such as a chain or cable 35, which, when the dumping scraper is connected to a tractor or the like, extends forwardly and is suitably connected to the side of the tractor driver's seat (see dotted lines Figs. 1 and 2).

Secured to the forward ends of the ridge forming scrapers 10 are vertically disposed bars 36, each provided with a vertical row of perforations 37, which latter are adapted to receive hooks, such as 38, carried by the rear ends of links 39. The forward ends of the links 39 are connected to a ring 40 that is adapted to be secured to the rear portion of the frame of the tractor used in drawing the dumping scraper and ridger over the ground. Depending from the ends of cross beam 14 are arms 41. On the lower ends of the arms 41 are vertically disposed plates 42 that are positioned immediately in front of the outer ends of the rotary dumping scrapers to extend forwardly from the wings on the scrapers, and which are effective in preventing the dirt that is caught by said scrapers from rolling, or spreading outwardly, and as a result the piles of dirt left by the rotary dumping scraper are relatively smooth and defined at their outer ends.

During the operation of my improved dumping scraper and ridger and while the scraping members 24 are in active positions, they are retained in such positions by the engagement of the rollers 28 against the angle irons 25 that are disposed at the tops of the scrapers.

When the scraping blades have become loaded and it is desired to dump the same, the driver of the tractor pulls forward on the flexible members 35 thereby rocking shafts 31 so as to swing the upper ends of the short crank arms 32 forward and consequently imparting forward movement to the rods 33. Such movement rocks the arms 27 upon their fulcrums so as to elevate the rear ends of said arms, thereby disengaging the rollers 28 from the angle bars 25, and as the machine continues to move forwardly, the dumping scrapers will rotate upon their axes thereby leaving the scraped portions of soil upon the surface of the ground. The operator immediately releases the members 35 so that the scrapers after making a half revolution are stopped in active or scraping position by the engagement of the rollers 28 against the uppermost angle bars 25.

When the machine is being moved to and from the point of use, it is desirable that the rotary scrapers shall rotate freely upon their axes, and in order to permit such operation, the arms 27 that carry the engaging and restraining rollers 28 are rendered inoperative by pulling the flexible members 35 forward so as to rock the shafts 31 and swing the short crank arms 32 downwardly below the horizontal plane occupied by the axes of the rock shafts, or into positions "below centre". When the parts are in this position the rollers 28 carried by the rear ends of arms 27 are maintained out of the paths of travel of the angle bars 25 so that the rotary scraping members may revolve freely as the machine is drawn forwardly over the ground. Obviously to restore the restraining means to active position it is only necessary to manipulate the cords or members 35 so as to rock shafts 31 and swing the crank arms 32 "above centre", whereupon springs 29 will act to swing arms 27 upon their fulcrums, so that the rollers 28 will be in position to cooperate with the angle bars 25.

Thus it will be seen that I have provided relatively simple and efficient means for controlling the operation of the rotary scraping members of a dumping scraper and ridger, which controlling means is readily operable from the driver's seat of the tractor utilized in hauling the dumping scraper and ridger over the ground.

It will be understood that minor changes in size, form, arrangement and construction of the various parts of my improved dumping scraper may be made and substituted for those herein shown and described without departing from the spirit of my invention, the scope of which is set forth in the appended claims.

I claim as my invention:

1. In combination with a rotary scraper including a blade and a wing extending forwardly from one end of the blade, a fixed plate positioned in front of the scraper so that it extends forward from the wing when the scraper is in operative position.

2. The combination with a machine of the character described having a rotary scraping member, of a vertically disposed plate positioned immediately in front of the outer end of said rotary scraping member to extend forward therefrom.

3. The combination with a machine of the character described having a rotary scraping member, of a stationary vertically disposed plate positioned immediately in front of the outer end of said rotary scraping member.

In testimony whereof I have signed my name to this specification.

JAMES M. COOK.